Figure 1:
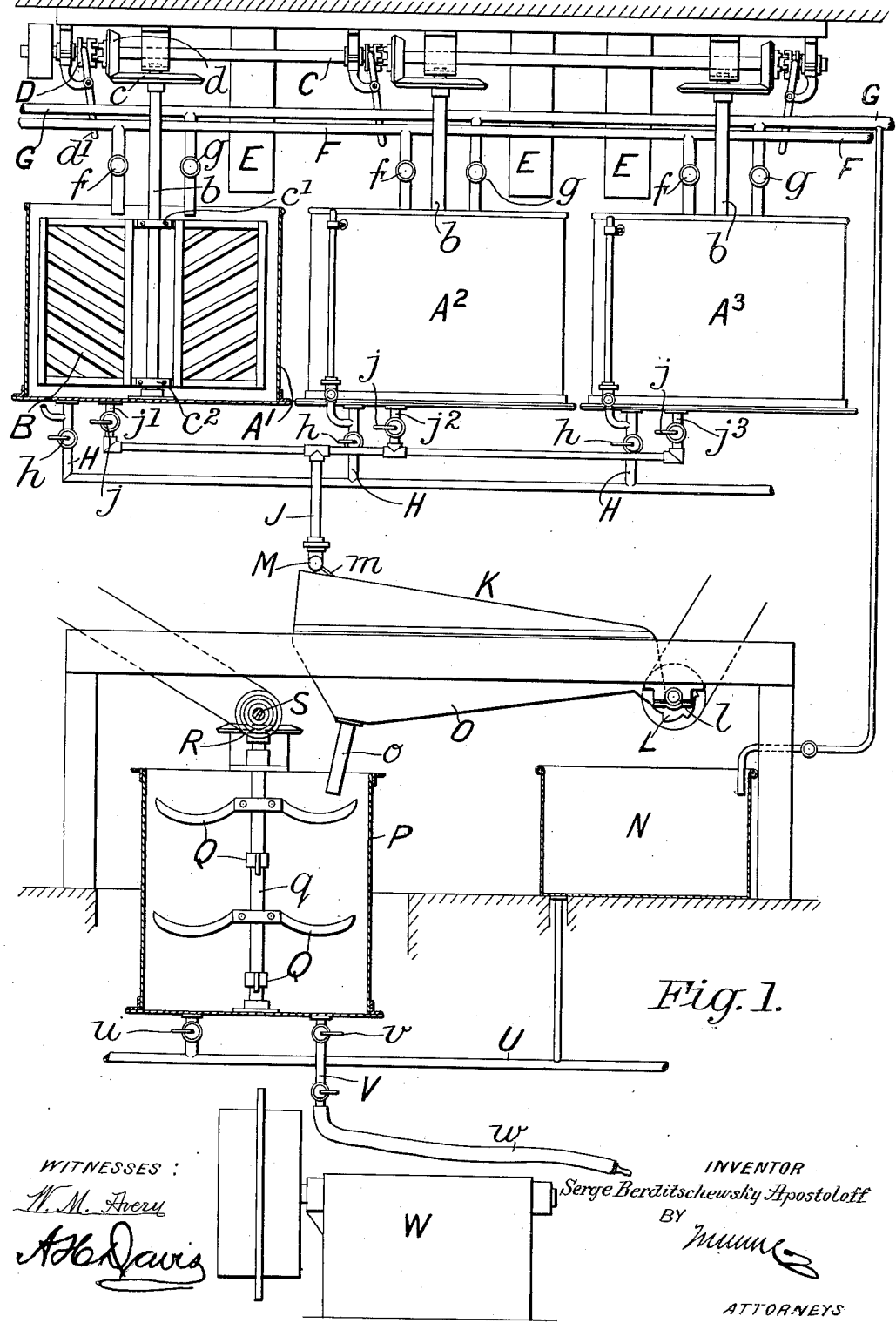

No. 826,824. PATENTED JULY 24, 1906.
S. B. APOSTOLOFF.
PROCESS OF UTILIZING THE NUTRITIVE PROPERTIES OF MIDDLINGS.
APPLICATION FILED MAY 22, 1905.

3 SHEETS—SHEET 2.

WITNESSES:

INVENTOR
Serge Berditschewsky Apostoloff
BY
ATTORNEYS

No. 826,824. PATENTED JULY 24, 1906.
S. B. APOSTOLOFF.
PROCESS OF UTILIZING THE NUTRITIVE PROPERTIES OF MIDDLINGS.
APPLICATION FILED MAY 22, 1905.

3 SHEETS—SHEET 3.

WITNESSES:

INVENTOR
Serge Berditschewsky Apostoloff
BY
ATTORNEYS

UNITED STATES PATENT OFFICE.

SERGE BERDITSCHEWSKY APOSTOLOFF, OF LONDON, ENGLAND.

PROCESS OF UTILIZING THE NUTRITIVE PROPERTIES OF MIDDLINGS.

No. 826,824.  Specification of Letters Patent.  Patented July 24, 1906.

Application filed May 22, 1905. Serial No. 261,577.

*To all whom it may concern:*

Be it known that I, SERGE BERDITSCHEWSKY APOSTOLOFF, engineer, a subject of the King of Great Britain, residing at 28 Bush Lane, Cannon street, in the city of London, England, have invented Processes of Utilizing the Nutritive Properties of Middlings, of which the following is a specification.

My invention relates to a process whereby the floury constituent of "middlings" (of whatever grade) may be extracted and utilized in bread-making by introducing it into the kneading apparatus and therein incorporating it with the flour for the "batch" instead of, as at present, allowing this valuable material to form merely a portion of a by-product, serving as a cattle-food, the invention rendering it practicable, while dispensing with the repeated grindings and siftings usually required in order to extract a high percentage of nutriment from the grain to avoid the waste which, if ordinary methods of treatment were followed, would result from employing only a single grinding.

The invention consists in a moist process of extraction whereby the entire floury constituent of the middlings (including those valuable food ingredients usually rejected along with the waste) is separated from the bran or insoluble constituent by means of water and in utilizing the resulting solution after fermentation with yeast and straining in the kneading apparatus, the fermented solution thus serving as a means of introducing (along with the dissolved or suspended floury element) the requisite quantity of moisture and yeast required for admixture with the ordinary flour to form the dough in bread-making.

The process of my invention involves the following steps—viz., dissolving out the floury constituent from the middlings; adding yeast to the liquor and fermenting; straining the fermented liquor, so as to separate the bran or insoluble matter contained therein, and, finally, passing the strained liquor resulting from these operations to the kneading-trough for admixture with the ordinary flour.

The operation should be carried out in a methodical and economical manner, gravity being utilized in the conveyance of the materials through the apparatus, and in what may be instanced as a typical example displaying the highest degree of economy in working the whole of the middlings produced in grinding a given quantity of grain would be subjected to the above-described treatment, and the resulting liquor would be employed in the production of bread by admixture with the flour obtained in grinding said quantity of grain, so that the only by-products from the entire process to which the grain is subjected (apart from the dry bran resulting from bolting the whole meal produced by the grinding) would be the insoluble constituent strained out of the liquor and such scum as may rise to the surface of the liquor during such time as the latter is left standing, these two by-products being capable of being employed in the preparation of a nutritious fermented food for animals.

The proportionate quantities of water and of yeast employed relatively to one another, to the middlings, and to the quantity of flour for a batch of bread are largely dependent upon the character of the middlings treated, of the flour with which the liquor is to be mixed in the formation of the dough, and of the bread to be produced, and consequently only approximate indications of a practical nature can be here stated; but assuming the process to be fully and properly carried out all the liquid and yeast required for admixture with the flour to form the dough will be provided by the fermented liquor.

The quantity of water employed for treating the middlings depends not only upon the proportion of floury constituent contained in the latter, but also on the quality of crust which the bread is to bear, the crust being thicker or thinner, harder or softer, and the bread more or less coated with crust in accordance with the proportion of water employed relatively to the floury constituent and also with the temperature of said water. The quantity of yeast to be employed will be dependent on the temperature of the air both inside and outside the factory, the temperature within the factory being preferably so regulated in accordance with that of the external atmosphere as to be maintained practically constant. The quantity of yeast used must also be in proportion to the total quantity of flour introduced into the kneader, or, in other words, to the floury constituent obtained from the middlings plus the ordinary flour with which said constituent is mixed.

The time occupied in the process of treating the middlings is partly dependent upon temperature and upon the readiness with which the floury constituent of the middlings dissolves out, the quantity of yeast which it is necessary to employ being likewise determined by considerations of temperature and time. The higher the temperature the more rapid the action, while the greater the time available the lower may be the temperature or the less the quantity of yeast required within certain limits. In this country at ordinary atmospheric temperatures it is necessary to employ warm water in the mixer, whereas in hot climates or during the height of summer the water-supply may be at the natural temperature.

From the foregoing it will be obvious that the best results can be obtained only by the exercise of skill and observation, and the above are only intended to serve as general directions to be observed in carrying out the process.

With materials of good average quality and under ordinary conditions of working the proportion of middlings to water in the mixer should be about nine to one hundred and the temperature about 86° Fahrenheit. The mixture of middlings and water may remain in the mixer from four to twelve hours, yeast being added from two to four hours before the liquor is to be run off in the proportion of from about three-quarters of a pound to one pound of yeast per sack of flour used in the kneading machine or trough.

The apparatus for carrying out the process comprises a mixing vessel for the water and middlings provided with hot and cold water supply, a stirring device, and means for running off the contents to the strainer, a bolter or straining apparatus, to which the contents of the mixer are delivered after fermentation, a tank to receive the liquor discharged from said strainer before its delivery to the kneader, and preferably a vessel or vessels for the reception of the bran or insoluble constituent separated from the liquor by the strainer and of the scum produced in and removed from the mixer.

Figure 2:
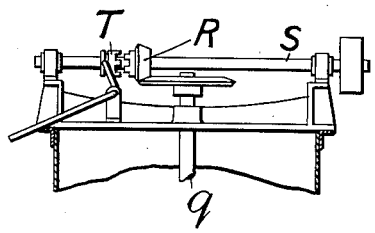
Figure 4:
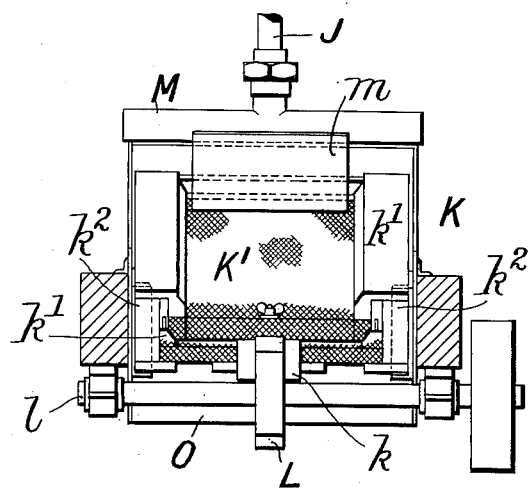
Figure 3:
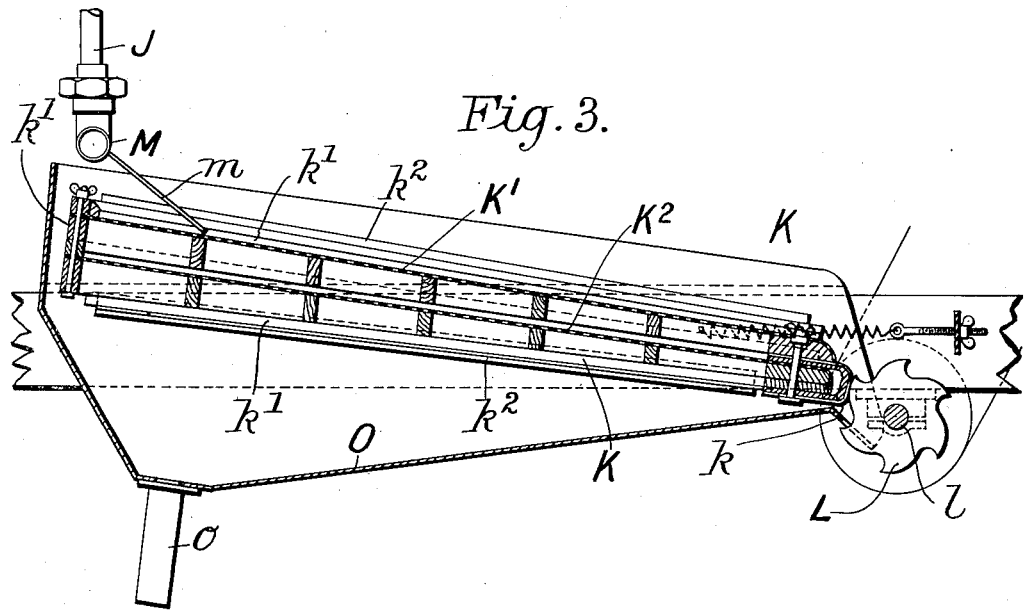
Figure 5:
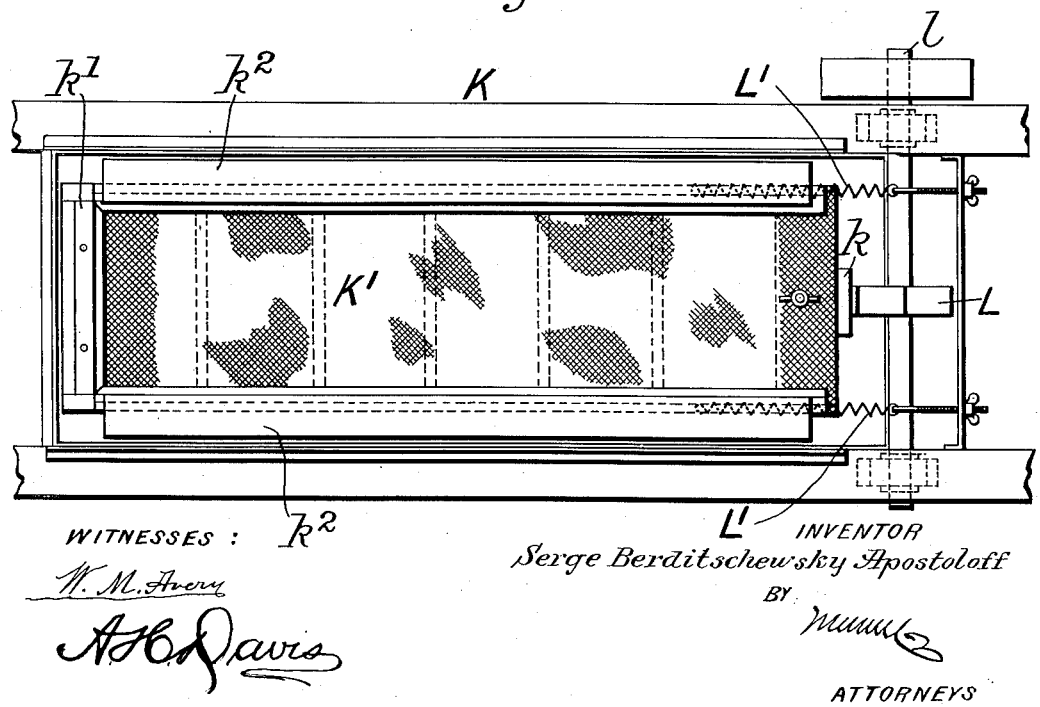

In the accompanying drawings, Figure 1 is a side elevation, partly in section, of an apparatus comprising a battery of three mixers, with the accompanying bolting or straining machine and "solution-tank" wherein the strained liquor is received preparatory to being delivered to the kneading machine or trough, such an installation being adapted for continuous working. Fig. 2 is a part side elevation of the solution-tank projected on a plane at right angles to that of Fig. 1. Fig. 3 is a longitudinal section, Fig. 4 an end elevation, and Fig. 5 a plan view, of the bolting or straining machine.

Similar letters of reference indicate like parts in all the figures.

Each mixer consists of an upright cylindrical vessel $A'$, $A^2$, or $A^3$, of suitable capacity and provided with a set of stirring-arms B, mounted on a shaft $b$, which is journaled in bearings $c'$ $c^2$, coaxial with the cylindrical vessel. The shaft $b$ carries at its upper end a bevel-wheel $c$, whereby rotary motion is transmitted to the shaft as required from a horizontal overhead driving-shaft C, which may be revolved continuously, the wheel $c$ meshing with a pinion $d$, which is loose on the shaft C, but which may be put into gear therewith by means of a clutch D, splined on shaft C and controlled by a handle $d'$, as indicated. Preferably the mixers $A'$ $A^2$ $A^3$ (which are of the same capacity) are so arranged that the same shaft C may serve to drive the stirring-gear of each.

E represents chutes for delivering the middlings to the respective mixers from a hopper at a higher level, cold and warm water being supplied to each mixer through pipes F and G, respectively, under the control of stop-valves $f$ and $g$. Each mixer is provided with a waste-pipe H, controlled by a stop-valve $h$, and with a discharge-outlet for the liquor controlled by a stop valve $j$, the delivery-pipes $J'$ $J^2$ $J^3$ from the outlets of the respective mixers being connected to a common pipe J, whereby the liquor may be conveyed to the bolter or straining apparatus. This latter comprises two inclined sieves $K'$ $K^2$, mounted the one directly above the other in a frame $k'$, which is caused to reciprocate rapidly in guides $k^2$ by means of a multiple tappet-wheel L, fast on a shaft $l$, which is rotated at a suitable speed, the teeth or tappets of the wheel striking a stop or abutment $k$ on the frame $k'$, so as to move the latter in opposition to a spring or springs $L'$.

The liquor from the mixer is delivered to the upper end of the top sieve $K'$ by means of a spreader on the end of the pipe J; this device consisting of a length of pipe M extending transversely of the sieve and having a longitudinal slit whereby the liquor is enabled to pass onto an inclined blade $m$, which insures the discharge of a thin film of liquor across the entire width of the sieve. The upper and lower sieves $K'$ $K^2$ have preferably about forty and fifty meshes to the lineal inch, respectively, so that any bran or insoluble matter that may pass through the upper sieve $K'$ will be arrested by the lower sieve $K^2$, all the refuse thus retained by the sieves descending over their surfaces and falling from their lower ends into a receptacle N, while the strained liquor, which has passed through both sieves, falls into a reversely-inclined chute O, whence it flows by way of a pipe $o$ to the storage-tank P. This tank consists of an upright cylindrical vessel substantially similar in construction to each of the mixers and equal in capacity to each of the latter. It is provided with stirring-arms Q, mounted on an axial shaft $q$ and rotated when required by bevel-gearing R from an overhead shaft S under the control of clutch mechanism T. The tank P has a waste-pipe U, controlled by a stop-valve $u$, while the liquor is discharged under the control of a stop-valve $v$ by means of a pipe V, whereby it is conveyed to a point in convenient proximity to the kneading machine or trough, (represented at W.) Preferably the pipe V terminates in a flexible hose $w$, provided with a suitable nozzle, so that the liquor may be sprayed over the flour in the kneading-machine during the preliminary portion of the kneading operation. The operation is conducted as follows: The quantity of water required for a batch is introduced into the mixer, the temperature being adjusted by regulating the proportions of cold and hot water supplied through the valves $f$ and $g$. The middlings are thereupon mixed with the water, the mixture being allowed to stand until the floury constituent of the middlings has become thoroughly soaked and dissolved. At the proper time in advance of the predetermined moment when the contents of the mixer are to be run out the requisite quantity of yeast is introduced. As fermentation proceeds the contents of the mixer swell and may at times threaten to overflow the vessel, in which case it is necessary to set the stirring-gear in motion, so as to break up the mass and permit the escape of the accumulated gases. When the fermented contents of the mixer are to be run off, the valve $j$ is opened and the stirring-gear is thrown into action, so as to insure the entire contents passing out through the pipe J, with the exception of any scum, which, remaining on the surface, is left in the mixer and afterward removed when the vessel is washed. The strainer K must be set in motion in readiness to deal with the contents of the mixer, which by it are separated into the strained fermented liquor and the bran or insoluble constituent, the former passing into the tank P, while the latter falls into the receptacle N. The liquor in the tank P is ready for use in the kneading apparatus W whenever required; but it is advisable before discharging the liquor to set the stirring-arms Q in motion, so as to insure every portion of the liquor being of uniform character.

Assuming a plant to be provided capable of working continuously, so as to produce, say, three batches of bread in the course of twenty-four hours, then with three mixers $A'$ $A^2$ $A^3$, as indicated in Fig. 1, the first, $A'$, being charged at midnight in readiness for being emptied the following midnight, the second, $A^2$, will require to be charged at eight a. m., and the third at four p. m., the yeast being added, say, four hours before each mixer is emptied.

Absolute cleanliness is essential, since unless the entire apparatus is washed thoroughly after each charge has been dealt with acid fermentation will be set up and the next charge consequently spoiled.

I claim—

1. The herein-described improvement in the manufacture of bread which consists in dissolving out the soluble portion of "middlings" by means of water, fermenting the solution by the addition of yeast, and then, after straining, passing the liquor into the kneader and using it in admixture with flour to make dough, substantially as described.

2. The herein-described process of making bread from middlings and flour, consisting in treating the middlings with water, adding a ferment and subjecting the solution to agitation during the fermentation, straining the solution, subjecting the solution to agitation and spraying the solution on the flour during the process of kneading.

SERGE BERDITSCHEWSKY APOSTOLOFF.

Witnesses:
E. A. LINETZ,
H. BASELEY